US006967012B2

(12) United States Patent
Meisner et al.

(10) Patent No.: US 6,967,012 B2
(45) Date of Patent: Nov. 22, 2005

(54) IMIDE/AMIDE HYDROGEN STORAGE MATERIALS AND METHODS

(75) Inventors: Gregory P. Meisner, Ann Arbor, MI (US); Frederick E. Pinkerton, Shelby Township, MI (US); Martin S. Meyer, Southfield, MI (US); Michael P. Balogh, Novi, MI (US); Matthew D. Kundrat, Detroit, MI (US)

(73) Assignee: General Motors Corporation, Detroit, MI (US)

( * ) Notice: Subject to any disclaimer, the term of this patent is extended or adjusted under 35 U.S.C. 154(b) by 155 days.

(21) Appl. No.: 10/603,474

(22) Filed: Jun. 25, 2003

(65) Prior Publication Data

US 2004/0265226 A1 Dec. 30, 2004

(51) Int. Cl.[7] ........................ C01B 21/092; C01B 6/02; C01B 6/04; C01B 6/06; C01B 6/24

(52) U.S. Cl. ...................... 423/413; 423/644; 423/645; 423/646; 423/647; 423/648.1; 423/658.2

(58) Field of Search ............................... 423/644, 645, 423/646, 647, 658.2, 413, 648.1

(56) References Cited

U.S. PATENT DOCUMENTS

| | | | | |
|---|---|---|---|---|
| 4,007,257 | A * | 2/1977 | Lemieux et al. ............ | 423/646 |
| 6,015,041 | A | 1/2000 | Heung | |
| 6,159,538 | A | 12/2000 | Rodriguez et al. | |
| 6,267,229 | B1 | 7/2001 | Heung | |
| 6,329,076 | B1 | 12/2001 | Kawabe et al. | |
| 6,342,198 | B1 | 1/2002 | Zaluska et al. | |
| 6,419,764 | B1 | 7/2002 | Kamiya et al. | |
| 6,432,379 | B1 | 8/2002 | Heung | |
| 6,444,361 | B1 | 9/2002 | Komori et al. | |
| 2003/0113252 | A1 | 6/2003 | Chen et al. | |
| 2003/0129122 | A1 | 7/2003 | Chen et al. | |
| 2003/0129126 | A1 | 7/2003 | Chen et al. | |

OTHER PUBLICATIONS

Chen, Ping, Xiong, Zhitao, Luo, Jizhong, Lin, Jianyi, Tan, Kuang Lee. "Hydrogen Storage in Metal Nitride Systems". Edited by Ricardo B. Schwartz Symposium V, Materials for Energy Storage, Generation and Transport, vol. 730, Apr. 2-4, 2002, pp. 376 and 385, V5.18.

Herbert Jacobs and Robert Juza, " Preparations and Properties of Magnesium Amide and Imide" Journal for Anorganic and General Chemistry, Band [vol.] 870 (1969) pp. 254-261. (English translation only; original German not available.), no month.

Chen, Ping, Xiong, Zhitao, Luo, Jizhong, Lin, Jianyi, Tan, Kuang Lee. "Interaction of Hydrogen with Metal Nitrides and Imides" Nature Publishing Group [vol. 420] (Nov. 21, 2002) pp. 302-304 with Supplement pp. 1-6.

Robert Juza and Karl Opp, Metal amides and metal nitrades, 25th Part 1), Journal for Anorganic and General Chemistry. 1951 Band vol. 266, pp. 325-330. (2 documents: English translation and original German.), no month.

* cited by examiner

*Primary Examiner*—Wayne A. Langel
(74) *Attorney, Agent, or Firm*—Kathryn A. Marra

(57) ABSTRACT

In one aspect, the invention provides a hydrogen storage composition having a hydrogenated state and a dehydrogenated state. In the hydrogenated state, such composition comprises an amide and a hydride. In a dehydrogenated state, the composition comprises an imide.

12 Claims, 2 Drawing Sheets

IMIDE/AMIDE HYDROGEN STORAGE MATERIALS AND METHODS

FIELD OF THE INVENTION

The present invention relates to hydrogen storage compositions, the method of making such hydrogen storage compositions and use thereof for storing hydrogen.

BACKGROUND OF THE INVENTION

Hydrogen is desirable as a source of energy because it reacts cleanly with air producing water as a by-product. In order to enhance the desirability of hydrogen as a fuel source, particularly for mobile applications, it is desirable to increase the available energy content per unit volume of storage. Presently, this is done by conventional means such as storage under high pressure, at thousands of pounds per square inch, cooling to a liquid state, or absorbing into a solid such as a metal hydride. Pressurization and liquification require relatively expensive processing and storage equipment.

Storing hydrogen in a solid material such as metal hydrides, provides volumetric hydrogen density which is relatively high and compact as a storage medium. Binding the hydrogen as a solid is desirable since it desorbs when heat is applied, thereby providing a controllable source of hydrogen.

Rechargeable hydrogen storage devices have been proposed to facilitate the use of hydrogen. Such devices may be relatively simple and generally are simply constructed as a shell and tube heat exchanger where the heat transfer medium delivers heat for desorption. Such heat transfer medium is supplied in channels separate from the chamber which houses the hydrogen storage material. Therefore, when hydrogen release is desired, hot fluid may be circulated through the channels, in heat transfer relationship with the storage material, to facilitate release of the hydrogen. To recharge the storage medium, hydrogen may be pumped into the chamber and through the storage material while the heat transfer medium removes heat, thus facilitating the charging or hydrogenating process. An exemplary hydrogen storage material and storage device arranged to provide suitable heat transfer surface and heat transfer medium for temperature management is exemplified in U.S. Pat. No. 6,015,041.

Presently, the selection of relatively light weight hydrogen storage material is essentially limited to magnesium and magnesium-based alloys which provide hydrogen storage capacity of several weight percent, essentially the best known conventional storage material with some reversible performance. However, there is limitation in that such magnesium based materials take up hydrogen at very high temperature and high hydrogen pressure. In addition, hydrogenation of the storage material is typically impeded by surface oxidation of the magnesium. Other examples such as $LaNi_5$ and TiFe that are reversible have relatively low gravimetric hydrogen storage density, since they are very heavy.

Therefore, in response to the desire for an improved hydrogen storage medium, the present invention provides an improved hydrogen storage composition, its use as a storage medium and a method for forming such materials.

SUMMARY OF THE INVENTION

In one aspect, the invention provides a hydrogen storage composition having a hydrogenated state and a dehydrogenated state. In the hydrogenated state, such composition comprises an amide and a hydride. The amide is preferably represented by the general formula $MI^d(NH_2)_d^{-1}$ and the hydride is preferably represented by the general formula $MII^f H_f$, where MI and MII respectively represent cationic species or a mixture of cationic species other than hydrogen, and d and f respectively represent the average valence states.

In a dehydrogenated state, the composition comprises an imide, which is represented by the formula $M^c(NH)_{c/2}^{-2}$, where M represents at least one cationic species other than hydrogen and c represents the average valence state of M. Thus, M represents a cation or a mixture of cationic species.

In another aspect, the invention provides a method of hydrogen storage according to the present invention, where gaseous hydrogen is contacted with the imide having such one or more cations besides hydrogen, and upon uptake of hydrogen, forms at least two distinct compounds different from the imide namely, the amide and the hydride.

As the imide takes up hydrogen for storage therein, heat is released and the aforesaid amide and hydride are formed. Thus, the imide is an exothermic hydrogen absorber. That is, hydrogen is inserted or taken up by the imide and heat is released. In the reverse reaction, the amide and hydride release hydrogen in the presence of one another, driven by heat, and the imide is formed. Accordingly, heat is used to cause the amide and the hydride to desorb or release hydrogen, and this reaction is endothermic.

In still another aspect of the invention, there is provided a method for forming the imide hydrogen storage material which comprises reacting the amide in the presence of the hydride to form the imide storage material. In another method of making the imide material, a nitride is reacted with an amide to form the imide. In still another method for making an imide hydrogen storage material, an amide is heated for a time and a temperature sufficient to produce an imide reaction product and release ammonia as a by-product. The ammonia is separated from the imide-based reaction product to thereby provide a suitable storage material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
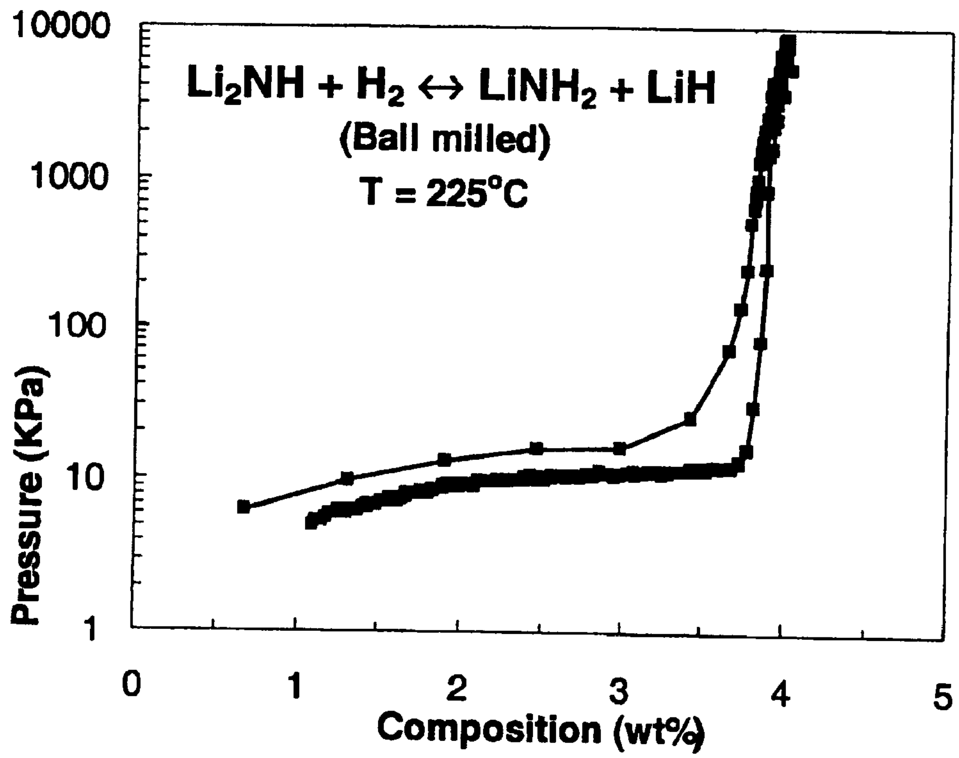
FIG. 1 shows hydrogen absorption and desorption of hydrogen in a ball milled mixture of $LiNH_2$ plus LiH.

The following description of the preferred embodiment(s) is merely exemplary in nature and is in no way intended to limit the invention, its application, or uses.

In one aspect, the invention provides a hydrogen storage composition having a hydrogenated state and a dehydrogenated state, therein providing two distinct physical states where hydrogen can be stored and subsequently released. In the hydrogenated state, such composition comprises an amide and a hydride, each of which are solids. The amide is preferably represented by the general formula $MI^{d}(NH_2)_d^{-1}$ and the hydride is preferably represented by the general formula $MII^{f}H_f$, where MI and MII respectively represent cationic species or a mixture of cationic species other than hydrogen, and d and f respectively represent the average valence states.

In a dehydrogenated state, the composition comprises an imide, which is a solid and is represented by the formula $M^{c}(NH)_{c/2}^{-2}$, where M represents at least one cationic species other than hydrogen and c represents the average valence state of M.

In the method of hydrogen storage of the present invention, gaseous hydrogen is contacted with the imide having such one or more cations besides hydrogen, and upon uptake of hydrogen, forms at least two distinct compounds different from the imide namely, the amide and the hydride. This corresponds to the hydrogenated state for the storage material.

A preferred imide is lithium imide represented by the formula $Li_2NH$, wherein the cation species is lithium, and the preferred distinct compounds formed upon hydrogen uptake are the amide represented by formula $LiNH_2$, and the hydride represented by the formula LiH.

It should be understood that in the present invention M, MI and MII each represent a cationic species or mixture of cationic species other than hydrogen. Examples are metal cations, non-metal cations such as boron, and non-metal cations which are organic such as $CH_3$. Elements that form preferred amides, imides, hydride-nitrides, and mixtures of cations in the type of compounds of the present invention are as follows. For amides the cationic species comprise: Li, Be, Na, Mg, K, Ca, Ni, Rb, Sr, In, Cs, Ba, La, Sm, Eu, and Yb. For imides the cationic species comprise: Li, Mg, Ca, Sr, Ba, La, Eu, and Th. For hydride-nitride the cationic species comprise: Si, Ca, Ti, Sr, Zr, Ba, and Th. For mixed amide/imide the cationic species comprise: Li, Be, Na, Mg, Al, Si, K, Ca, Mn, Zn, Ga, Rb, Sr, Y, In, Sn, Cs, Ba, La, Pb, Ce, Nd, Sm, Eu, Gd, and Yb. For other related materials such as coordination-type NH-containing materials the cationic species comprise: Li, Be, B, Na, K, Ca, Ni, Cu, As, Se, Sr, In, Sb, La, W, Eu, and Th. Evaluation of the aforesaid known species produces, by analogy the following added cationic species besides those recited above which are thought to be usable but not yet demonstrated, include Fe, Sc, Ge, Cd, Hf, Hg, Tl, and Pr. In view of the above, the cationic species generally comprise: aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), tungsten (W), yttrium (Y), ytterbium (Yb), zinc (Zn), and zirconium (Zr).

An analysis of the behavior and crystallography of the aforesaid amides, imides, hydride/nitride, mixed amide/imide, and other related materials such as coordination-type NH-containing materials reveals that some of the aforesaid compounds such as lithium demonstrate a relatively simple chemistry of the amide and the imide. Other materials, particularly hydride/nitride compounds involving calcium and relatively heavier cation elements, form related phases based upon systematic behavior demonstrated by the imides and amides and according to the literature. Such related materials are not necessarily characterized as an amide or an imide and principally fall into the category of the hydride/nitride stated earlier. Such materials involve hydrogen and nitrogen and comprise cationic species having ammonia complex to them, so they are ammonia-containing materials, but not amides or imides. Such more complex type salts involve the aforesaid cations having a higher number of nitrogen surrounding it as compared to the amide and imides. For example, simple lithium amide has an Li coordinated with one $NH_2$. Whereas, the more complex compounds have the lithium coordinated with more than one $NH_3$ group. Therefore, the invention encompasses all of the hydrogen storage capable nitride/hydride type materials and compounds some of which involve cations having affinity to ammonia as well as the more traditional $NH_2$. The invention also contemplates intermediate products arising during a series of reactions in the gas and solid phases associated with the hydrogen storage media.

It should be noted that M, MI and MII are independently selected and each may be different, or any two or more may be the same, cationic species. Preferably M, MI and MII each represent one or a mixture select from the group consisting of lithium, magnesium, sodium, boron, aluminum, beryllium, and zinc. In a preferred embodiment, all such M, MI and MII represent lithium, or mixed metal including lithium, such as LiNa.

Another suitable composition for reversibly cycling or storing hydrogen is exemplified by the imide MgNH which upon uptake of hydrogen forms an amide represented by the formula $Mg(NH_2)_2$ and a hydride represented by the formula $MgH_2$.

In another aspect, the invention provides a method for storing and releasing hydrogen comprising cycling hydrogen according to the general mechanism:

$$M(NH)_x + wH_2 \leftrightarrows MI(NH_2)_x + MIIH_z$$

where x and z are selected to maintain charge neutrality; MI, MII and M each represent one or more cations; and 2w=x+z.

As the imide takes up hydrogen for storage therein, heat is released and the aforesaid amide and hydride are formed. Thus, the imide is an exothermic hydrogen absorber. In the reverse reaction, the amide and hydride release hydrogen in the presence of one another, driven by heat, and the imide is formed. Accordingly, heat is used to cause the amide and the hydride to desorb or release hydrogen.

Preferred temperature and pressure conditions for charging the hydrogen into the storage material are temperature range of about room temperature to about 380° C. and pressures of about 0 (vacuum) to about 10 atm. At about 380° C. and less then 10 atmospheres, hydrogen will tend to be released. At lower temperatures the pressure to release is correspondingly lower.

It should be noted that the system behaves in a manner whereby at each temperature, there is a threshold pressure above which hydrogen is absorbed and below which hydrogen is desorbed. For example, at 125° C. in order to desorb, pressure is preferably less than 10 kPa. It is possible to desorb at up to 1000 kPa at temperatures higher that about 340° C. By way of further example, at room temperature, the pressure for hydrogen release is near zero, vacuum. At elevated temperatures, on the order of 380° C., hydrogen is released until pressure is above about 10 atm. Then at such elevated pressure, hydrogen is inserted.

Particle size of the storage material is related to its performance. Particles which are too coarse extend the time for absorbtion/desorption at a given temperature. It has been found that starting material particle size on the order of 500 microns (one half millimeter) ball milled for 1 to 10 hours form suitable material. This results in particle size on the order of less than about 10 microns.

In still another aspect of the invention, there is provided a method for forming the imide based hydrogen storage material which comprises reacting the amide in the presence of the hydride to form the imide storage medium. Here, the amide and hydride in particulate form are mixed together and heated to release hydrogen and form the imide product.

In another method of making the imide based material, a nitride, preferably represented by formula $MIII^{g}N_{3/g}$ is reacted with an amide, preferably represented by the formula $MI^{d}(NH_2)_d^{-1}$ to form the imide. The nitride and amide components in particle form are mixed together and heated to produce the imide. In accordance with the description above, MIII represents cationic species other than, different from, hydrogen, and g represents the average valence state of MIII.

In still another method for making an imide based hydrogen storage material, and amide is heated for a time and a temperature sufficient to produce the imide based reaction product and release ammonia as a by-product. The ammonia is separated from the imide-based reaction product to thereby provide a suitable storage material.

A preferred hydrogen storage material comprises lithium imide which upon uptake of hydrogen forms the lithium amide and lithium hydride. Such lithium imide is formed preferably by one of the foregoing methods including: (1) reacting lithium amide with lithium hydride to release hydrogen and form the lithium imide; (2) reacting lithium nitride with lithium amide to form the lithium imide; and (3) the heating of lithium amide under conditions sufficient to release ammonia, and then separating such ammonia, for example, in gas form, to provide the lithium imide storage product.

The foregoing lithium storage system based upon the imide absorbs hydrogen at a temperature of preferably greater than or equal to 145 degrees Celsius and hydrogen pressures as low as 5 kPa, but preferably greater than or equal to 15 kPa. In a preferred system, the amide and hydride constituents release or desorb hydrogen at a temperature greater than or equal to 125 degrees Celsius and at hydrogen pressure that is less than or equal to 10 kPa, thereby forming the imide constituent as heretofore described.

The hydrogen storage system is also exemplified by:

$$2M^{+x}(NH)_{x/2}+xH_2 \leftrightarrows M^{+x}(NH_2)_x+M^{+x}H_x$$

where M is a metal or mixtures of metals as defined hereinabove and preferably Li-based. Here, x is the valence state of the metal or average valence state of the metal mixture, N is nitrogen, and H is hydrogen. The essential material is either the metal imide, represented by $2M^{+x}(NH)_{x/2}$ or a mixture of the metal amide and metal hydride respectively represented by $M^{+x}(NH_2)_x$ and $M^{+x}H_x$. The absorption or desorption of hydrogen is determined/controlled by the temperature and hydrogen pressure of the storage medium. That is, hydrogen absorption by the imide-based materials occurs as the imide temperature decreases, that is, heat is released and the reaction is exothermic. Conversely, heating facilitates reaction of amide and hydride to release hydrogen, and the reaction is endothermic.

EXAMPLES

This example demonstrates hydrogen storage medium wherein the cation is lithium in the system:

$$Li_2NH+H_2 \leftrightarrows LiNH_2+LiH.$$

The system was formed from a wide variety of starting materials using preparation techniques exemplified by the following:

1. Mixing an equal molar ratio of lithium amide ($LiNH_2$) and lithium hydride (LiH) forms the hydrogen storage media system, that can release hydrogen according to the following reaction to form the imide $Li_2NH$ as follows:

$$LiNH_2+LiH \rightarrow Li_2NH+H_2.$$

Method (1) was demonstrated in the laboratory, and mixing was accomplished using standard ball milling techniques at room temperature under argon gas for 10 hours. The heating to release the hydrogen was conducted at a temperature of 230° C. and pressure 130 kPa under helium atmosphere in the high pressure thermogravimetric analysis apparatus. It should be understood that the amide and hydride together form the hydrogen storage system. Thus, forming the hydrogen storage system does not require heating. However, releasing and re-absorbing hydrogen does require heating.

2. Ball milling an equal molar ratio of lithium nitride ($Li_3N$) and lithium amide ($LiNH_2$) according to the following to form the imide $Li_2NH$.

$$Li_3N+LiNH_2 \rightarrow 2Li_2NH.$$

Method (2) was demonstrated in the laboratory, and mixing was accomplished using standard ball milling techniques as above. Again, heating is not required to form the hydrogen storage system. Heating is necessary for the absorption and desorption process for operating of the system.

3. Evolving ammonia ($NH_3$) from lithium amide ($LiNH_2$) by heating according to the following reaction:

$$2LiNH_2 \rightarrow Li_2NH+NH_3$$

Method (3) was demonstrated in the laboratory by heating to at least 150° C. under flowing helium and/or vacuum conditions. Higher temperatures cause greater reaction rate, and greater then 300° C. is suitable. Above 600° is not desirable.

4. Hydrogenating lithium nitride ($Li_3N$) according to the following reaction:

$$Li_3N+2H_2 \rightarrow LiNH_2+2LiH$$

This was demonstrated in the laboratory, but the stoichiometry of the reaction produces excess lithium hydride in relation to the amide produced, which decreases the hydrogen storage capacity of the system. This method was conducted by heating $Li_3N$ to 159° C. and exposing it to hydrogen at pressures up to 85 bars (8500 kPa).

As to Method 4, it was noted that besides the disadvantage of producing excess, dead weight LiH, it is not feasible to separate such LiH from the desirable amide product. Further, empirical observations have shown that the reverse of the reaction does not occur, (i.e., irreversible reaction), under the conditions of temperature and pressure studied here. There is speculation as to possible reversibility at much higher and impractical temperatures. Clearly, starting from lithium nitride results in excess lithium hydride, which does not contribute to reversible hydrogen storage. Therefore new synthesis routes 1, 2 and 3 eliminate the excess lithium hydride.

It has been suggested that lithium nitride ($Li_3N$) absorbs hydrogen forming lithium amide ($LiNH_2$); and lithium hydride (LiH); and speculated that the reaction is reversible. In tests conducted in connection with the present invention, it was demonstrated that the reaction is not reversible at the temperatures and pressures as explored here.

In accordance with the present invention, the hydride and amide desorb hydrogen to form lithium imide ($Li_2NH$). The imide of the lithium system prepared as above, methods 1, 2 and 3, absorb hydrogen at temperatures of 125° C. to 340° C. and hydrogen pressures of about 5 to about 15 kPa at 125° C. ranging up to about 1000 kPa at about 340° C.; and desorbs at temperatures 125° C. to 340° C. and hydrogen pressures less than or equal to about 10 kPa at 125° C. ranging up to less than or equal to about 1000 kPa at 340° C. For example, at 125° C. in order to desorb, pressure is preferably less than 10 kPa. It is possible to desorb at up to 1000 kPa at temperatures higher that about 340° C.

Figure 2:
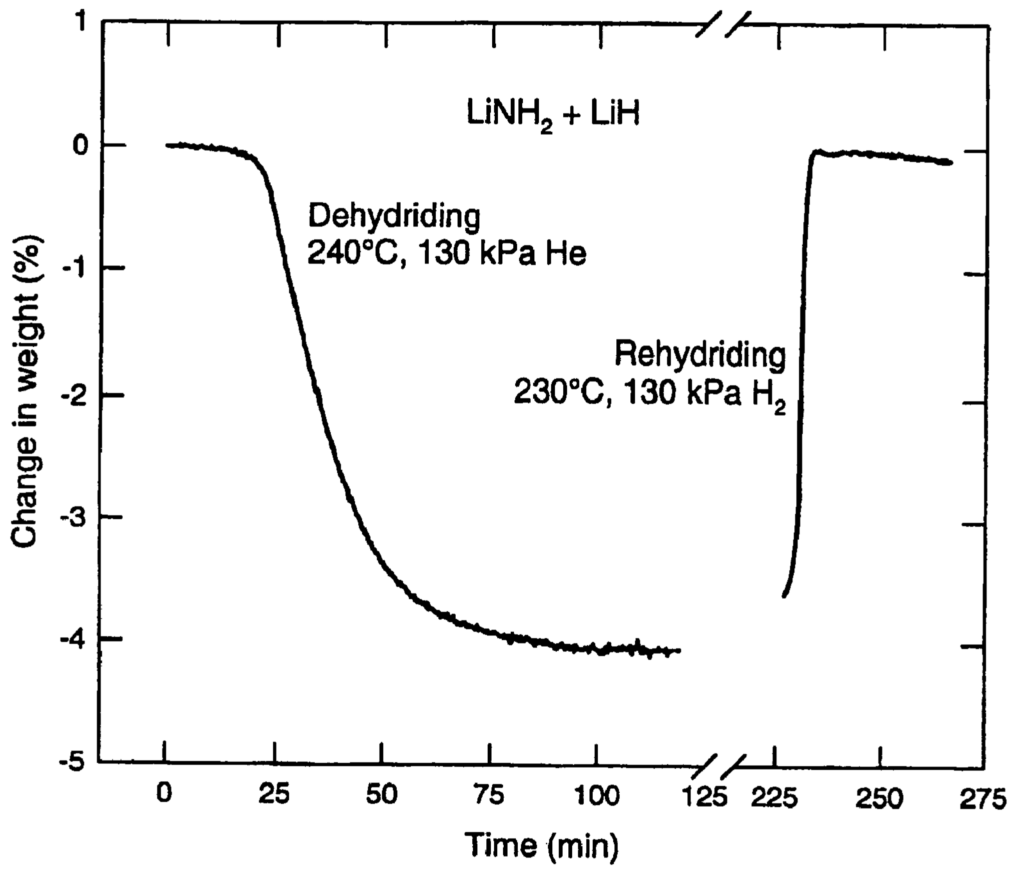
FIG. 2 shows the weight change versus time for the ball-milled mixture $LiNH_2$+LiH.

Reversible hydrogen storage was successfully demonstrated in the lithium imide ($Li_2NH$), lithium amide ($LiNH_2$) lithium hydride (LiH) system according to the data shown in FIGS. 1 and 2.

FIG. 1 shows hydrogen absorption and desorption of hydrogen in a ball milled mixture of $LiNH_2$ plus LiH. The mixture was first heated to about 225° C. to convert $LiNH_2$+LiH to the imide phase $Li_2NH$ as hydrogen gas was pumped out of the sample chamber. Hydrogen is absorbed as the hydrogen gas pressure increased and then subsequently desorbed as the hydrogen gas pressure is decreased at a temperature of 225° C. as measured by volumetric experiments.

FIG. 2 shows the weight change versus time for the ball-milled mixture $LiNH_2$+LiH. The mixture was first heated to about 240° C. at 10° C./min in 130 kPa of flowing helium gas to convert $LiNH_2$+LiH to the imide phase $Li_2NH$ as hydrogen gas desorbed. In FIG. 2, heating starts at time t=0, and the sample reached 240° C. at t=23 min. The sample desorbed 4.0 wt % hydrogen. The sample was cooled back to room temperature and flowing hydrogen gas was introduced at 130 kPa (the data during this interval have been omitted for clarity). The sample was heated to 230° C. starting at t=215 min, reaching 230° C. at t=236 min. The weight gain demonstrated reabsorption of hydrogen by the imide material.

According to the above experiments, for each 30.91240 grams of an equal molar mixture of $LiNH_2$ and LiH, 2.0158 grams of $H_2$ was liberated. This corresponds to 6.52% by weight of $H_2$ liberated based on the weight of the starting materials.

Thus, the hydrogen storage materials according to the present invention provide reversible solid phase hydrogen storage, which is especially advantageous in fuel cell applications. The reversibility of the storage is readily controlled by temperature, pressure, and hydrogen concentrations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of storing hydrogen comprising:

contacting gaseous hydrogen with an imide represented by $M^c(NH)^{-2}{}_{c/2}$, where M represents a cationic species of at least one member selected from group consisting of Li, Mg, Na, B, Al, Be, Zn, and mixtures thereof and c represents an average valence state of M, wherein said imide forms at least two distinct compounds different from said imide upon reaction with hydrogen.

2. The method of claim 1 wherein said at least two distinct compounds comprise an amide and a hydride.

3. The method of claim 1 wherein said at least two distinct compounds comprise a first compound represented by $MI^d(NH_2)_d^{-1}$ (amide) and a second compound represented $MIIH_f$ (hydride), where MI and MII respectively represent cationic species or a mixture of cationic species other than hydrogen, and d represents an average valence state of MI and f represents an average valence state MII.

4. The method of claim 1 wherein said imide is lithium imide represented by $Li_2NH$ and said distinct compounds comprise a first compound represented by $LiNH_2$, and a second compound represented by LiH.

5. The method of claim 1 wherein M comprises an element selected from the group consisting of Li, Mg, Na, Be, and mixtures thereof.

6. The method of claim 2 wherein said imide is represented by the formula MgNH, said amide is represented by the formula $Mg(NH_2)_2$ and said hydride is represented by the formula $MgH_2$.

7. The method of claim 3 wherein said M, MI and MII are each elements independently selected.

8. The method of claim 7 wherein at least one of said MI and MII comprises said cationic species selected as M and further MI and MII optionally comprise an additional element independently selected from the group consisting of Ba, Ca, Eu, La, Li, Mg, Si, Sr, Th, Ti, Zr, and mixtures thereof.

9. The method of claim 7 wherein at least one of said MI and MII comprises said cationic species selected as M and further MI and MII optionally comprise an additional element independently selected from the group consisting of Al, Ba, Be, Ca, Ce, Cs, Eu, Ga, Gd, In, K, La, Li, Mg, Mn, Na, Nd, Pb, Rb, Si, Sm, Sn, Sr, Y, Yb, Zn, and mixtures thereof.

10. The method of claim 7 wherein M, MI and MII are each elements independently selected from the group consisting of Be, Mg, Li, Na, and mixtures thereof.

11. The method of claim 1 wherein M is selected from the group consisting of Li, Be, Mg, Na, and mixtures thereof.

12. The method of claim 1 wherein M comprises Li.

* * * * *